United States Patent [19]
Cassonnet et al.

[11] Patent Number: 5,367,693
[45] Date of Patent: Nov. 22, 1994

[54] SYSTEM FOR DIALOG AMONG PROCESSORS AND DISPATCHING PROCESSES TO PROCESSORS WHICH MONITORS THE NUMBER OF ACKNOWLEDGEMENTS TO PROCESSING REQUESTS

[75] Inventors: Jean-Claude Cassonnet, Saint-Honorine; Jean-Louis Fressineau, Millemont; Georges Lecourtier, Versailles, all of France

[73] Assignee: Bull, S.A., Paris, France

[21] Appl. No.: 710,340

[22] Filed: Jun. 5, 1991

[30] Foreign Application Priority Data

Jun. 5, 1990 [FR] France ................. 90 06948

[51] Int. Cl.$^5$ ........................................ G06F 13/14
[52] U.S. Cl. ................... 395/800; 364/240.9; 364/284; 364/270.6; 364/260; 364/DIG. 1; 395/325
[58] Field of Search .................. 395/325, 800

[56] References Cited

U.S. PATENT DOCUMENTS

| | | | |
|---|---|---|---|
| 4,181,974 | 1/1980 | Lemay | 395/200 |
| 4,412,303 | 10/1983 | Barnes | 395/800 |
| 4,453,211 | 6/1984 | Askinazi | 395/500 |
| 4,719,622 | 1/1988 | Whipple | 370/85 |
| 5,068,785 | 11/1991 | Sugiyama | 395/325 |

*Primary Examiner*—Eric Coleman
*Attorney, Agent, or Firm*—Kerkam, Stowell, Kondracki & Clarke

[57] ABSTRACT

For certain operations executed in a multiprocessor system, the processors communicate with one another by exchanging requests and acknowledgements. To improve performance, the invention proposes a method by which the operations which require sending of multiple requests proceed without taking into account the reception of the acknowledgements. The total number of requests required is calculated and the number of acknowledgements received is counted. The end of the operation is conditioned by the equality of these two numbers. The invention also relates to a system for employing the method, and to the application of the method to dispatching.

26 Claims, 7 Drawing Sheets

SYSTEM FOR DIALOG AMONG PROCESSORS AND DISPATCHING PROCESSES TO PROCESSORS WHICH MONITORS THE NUMBER OF ACKNOWLEDGEMENTS TO PROCESSING REQUESTS

FIELD OF THE INVENTION

The invention relates generally to the field of multiprocessor-type information processing systems and more particularly to the method of dialog between the processors of such a system and a system which utilizes the method.

BACKGROUND OF THE INVENTION

In a multiprocessor system, the processors must be able to communicate among one another under many circumstances, to assure a certain coherence of operation. To do so, means are provided that enable dialog between any two processors. The processor that initiates the dialog then issues a request to another addressee processor, which sends an acknowledgement intended for the originator to indicate that it has taken the request into account. Then, in response to the request received, the receiving processor is generally made to interrupt the operations it is running before the request was received. This dialog between processors makes it possible to employ what is typically known as an interrupt mechanism.

Dialog between processors occurs under numerous circumstances in the course of operation of the system. The set of these possibilities can be subdivided into two categories: selective requests, where an originating processor addresses a request to a particular addressee processor; global requests, where a processor addresses a request to all the other processors of the system simultaneously.

Generally, requests are sent in the course of the execution of particular operations by the originating processor, and the accomplishment of these operations is on the condition of the reception of acknowledgements from the addressee processors. As a result, an operation that requires sending requests includes a phase of monitoring the acknowledgements received.

To this end, one conventional solution comprises interrupting the ongoing operation for each request, in order to monitor reception of the corresponding acknowledgement. This solution, which is the simplest, is valuable in cases where the order of acceptance by the addressee processors must be the same as that in which the corresponding requests were sent. Quite often, however, such synchronization of the recipient processors is unnecessary, and the only important factor is that the recipient processors have effectively accepted their respective requests. In that case, the conventional solution mentioned above is not optimal in terms of system performance. In fact, the time interval between sending of a request and the instant when the acknowledgement is received may be relatively long, because the addressee processor may be in the process of running a long operation at the time the request is sent that cannot be interrupted. Only after this operation is completely finished, can the request be accepted and the acknowledgement sent. During this entire period of time, the originating processor is in a waiting state. The degradation in system performance is limited, however, if the number of multiple requests for any operation is in turn limited, which is the case if the number of processors in the system is itself limited. On the other hand, in systems that include a large number of processors, the reduction in performance is not insignificant, particularly in the case of operations involving distributing processes to processors (often called "dispatching"), which are triggered more often, the higher the number of processors.

SUMMARY OF THE INVENTION

Accordingly, it is the object of the invention to overcome this disadvantage, by proposing a method for dialog between processors of the system that provides maximum reduction of the waiting time for the processors originating multiple requests sent in the course of operations that require no constraint in terms of the order in which the requests are accepted by the addressee processors.

To this end, the subject of the invention is a method for dialog between processors of a multiprocessor information processing system, said dialog being produced when one of said processors executes operations triggering the sending of requests addressed to at least one other processor, each addressee processor sending an acknowledgement signal to the originating processor that it accepts said request, said method being characterized in that for any operation not requiring any constraint as to the order in which these requests are accepted by the addressee processors, the execution of said operations elapses without taking into account the reception by the originating processor of acknowledgements brought about by the sending of requests in the course of said operation; that in the course of said operation the total number of requests that are to be sent or must be sent by the processor executing said operation is calculated; that the number of acknowledgements received by the originating processor is counted; and that the end of said operation is on the condition of the equality of said total number of requests and said number of acknowledgements received.

It is desirable for the dialog method proposed to be capable of easy integration with other exchange mechanisms provided in a multiprocessor system. Thus, in a secondary characteristic of the method, the requests and the acknowledgements take the form of messages, containing an indication of the type of message, and particularly if it involves an acknowledgement, that the reception of an acknowledgement by a processor comprises detecting that a message addressed to the processor has been sent and that this message is an acknowledgement.

Generally, a processor includes processing means, most often microprogrammed, and separate interface circuits capable of memorizing the messages received. Thus it is important to use this capability by making the processing and acknowledgement counting operations parallel. To this end, and in a further supplementary characteristic of the method, counting of the number of acknowledgements received by a processor is effected independently of the reading of the corresponding acknowledgement messages by the processing means of said processor; and said number of acknowledgements received is permanently placed in the last message received and addressed to the processing means, monitoring of the equality between the number of requests and the number of acknowledgements being effected by the processing means after the reading of the last message.

Often, the reading of the messages received is accompanied by its being reset to zero. Furthermore and still for the sake of facilitating integration of the invention into the system, and in a further characteristic of the method, the reading of the last message by the processing means causes the resetting to zero of the number of acknowledgements, on the condition that no new acknowledgement has arrived during this reading. Once this reading has been done, the number of requests is reduced by the number of acknowledgements, the equalities between the number of requests and the number of acknowledgements being then established when the new number of requests thus calculated equals zero.

Finally, the production of several dialogs triggered by several processors simultaneously should be avoided. To do so, and in yet another feature of the invention, the method is characterized in that the execution by a processor of an operation capable of triggering the sending of multiple requests is authorized only after the "free" state of at least one system lock has been tested, in which case the effective execution of said operation is preceded by the assumption of the "busy" state of said lock, and that said lock is freed when said operation is completed.

The invention also relates to an information processing system with which the method can be employed. This system includes a plurality of processors capable of dialog by way of interface circuits associated respectively with said processors and bus links connecting said interface circuits to one another, at least one of said processors including means for executing operations triggering the sending of a request addressed to at least one other processor, each addressee processor including means for sending an acknowledgement to the originating processor to signal that it accepts a request addressed to it, said system being characterized in that said request originating processor includes:

first counting means enabling the determination of the total number of requests that are to be sent or must be sent in the course of said operations;

second counting means, activated each time an acknowledgement is received;

comparison means to detect the equality between said number of requests and the number of acknowledgements received;

and that for each operation that requires a dialog without constraint as to the order of acceptance of requests by the addressee processors, said detection of equality authorizes the originating processor to complete the execution of said operation.

Further characteristics and details of embodiment for employing the invention in particular for making the counting means, will be explained in the ensuing description.

The method and system according to the invention may have multiple applications, each time an operation requires multiple requests, whether they are selective or global. The invention can be used not only for dialog between the execution processors of the system, but also to make exchanges between the execution processors and the input/output processors.

As a first example of an application, the operation triggered by the "CLEAR" instruction executed by one of the processors and intended to erase the contents of the cache registers of the set of processors can be mentioned. This operation requires the sending of a global request giving the order to the other processors to erase the contents of these registers. In accordance with the invention, sending of the requests can be done at the beginning of the operation. Next, the originating processor performs the erasure of its own registers, and only then does it check whether the recipient processors have indeed received the request.

Another particularly important application of the invention relates to dispatching, as mentioned above. This problem is the subject of U.S. Pat. No. 4,590,550, issued on May 20, 1986 (corresponding to European Patent EP-B1-30504) and which is hereby incorporated by reference in the present specification.

Without recapitulating all the details of this mechanism, it will be useful, however, to remember that the operation of dispatching is triggered by an event capable of causing a modification in the choice of processes that must be executed. This SELECT operation determines the allocation of the processes to the processors of the system, in particular as a function of an order of priority of processes ready to be executed.

As an example of an event, the semaphore operations P or V can be cited, which are capable of causing an interruption of a process being executed or reactivating a process in the waiting state. The P and V semaphore operations are described in U.S. Pat. No. 4,374,409, issued on Feb. 15, 1983 (corresponding to French Patent 2 253 420). The semaphores are described in U.S. Pat. No. 4,395,757, issued Jul. 26, 1983, (corresponding to French Patent 2 253 418).

These patents mention the existence in the system of a queue Q/PR/RDY of the ready processes. Among these processes, certain ones of them are active, that is, they are being executed in one of the processors, while other are waiting, or in other words are ready to be executed but are waiting for a processor to be allocated to them.

Thus in the course of the SELECT operation, the queue Q/PR/RDY is examined, and the processors are allocated to the processes in accordance with their order of priority, until there are no further processes to be allocated or no further available processors.

In the course of the SELECT operation, a request is sent to each processor selected, to inform it that a process has been allocated to it. Upon accepting this request, the addressee processor sends an acknowledgement to the processor performing the SELECT operation.

The SELECT operation can then use the dialog method according to the invention.

The importance of applying the invention to this operation may be appreciated by noting that the selection of processors and associated processes may be spread out over the course of a rather long operation. This is the case particularly if the system is provided to assign certain processes to a particular processor. In that case, the selection operation includes:

a first step, in the course of which the cases with constraint are processed, that is: identification of the processes assigned to particular processors, and then for each processor selected, incrementation of the first counting means and sending of a request to the processor selected;

a second step of processing the cases without constraint, that is: determination of the processes that remain to be assigned, and then for each process then selected, incrementation of the first counting means and loading its identity into a stack;

a third step of emptying said stack, in the course of which, for each process extracted from the pile, one request is sent to a processor that remains available.

Further aspects for applying the invention to dispatching will be explained in further detail in the ensuing description.

DESCRIPTION OF THE PREFERRED EMBODIMENTS

Figure 1:
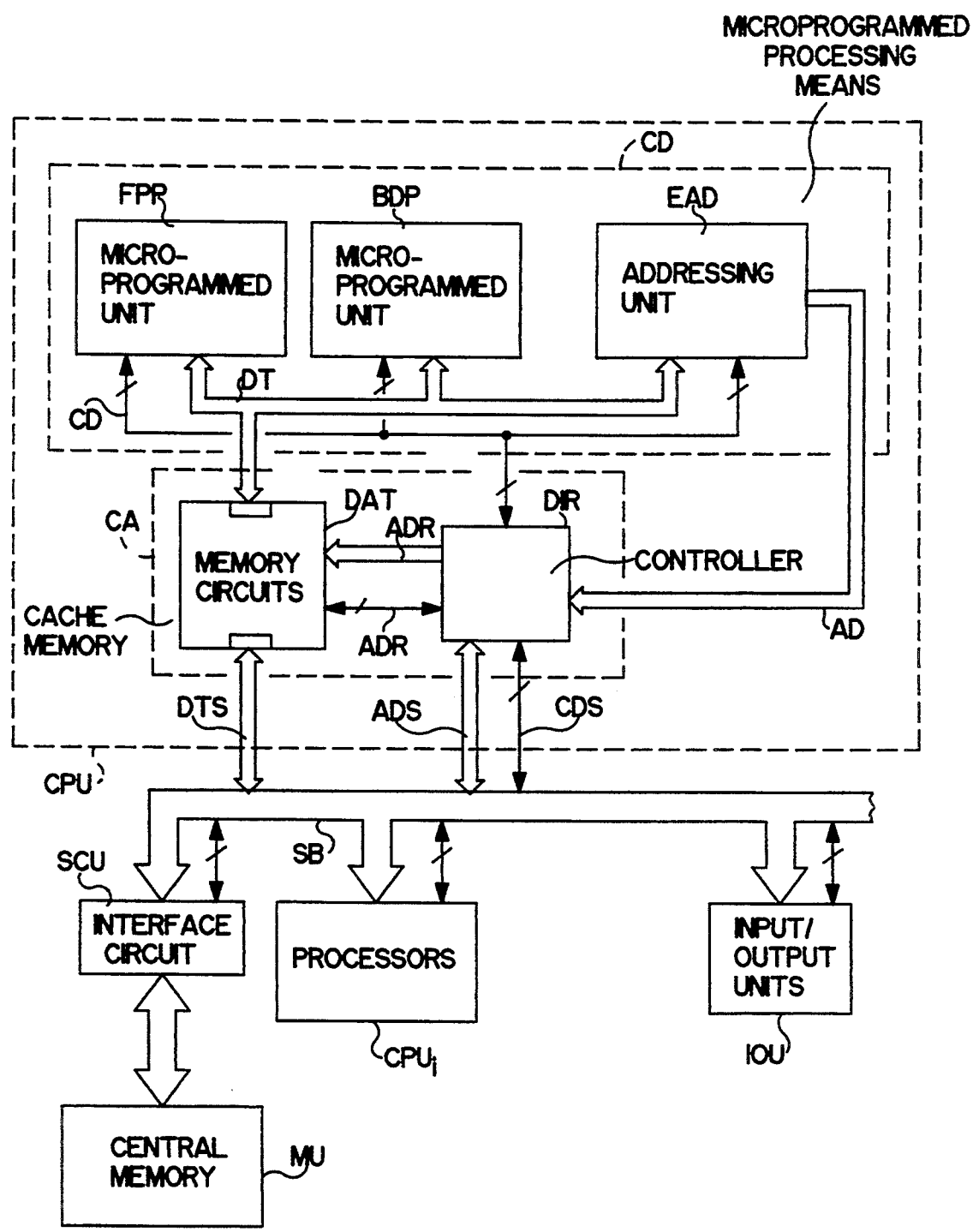
FIG. 1 shows the central subsystem of an information processing system for performing the invention.

The system shown in FIG. 1 comprises what it known as a central subsystem of an information processing system. It comprises a plurality of processors CPU, CPU$_i$, connected to a system bus SB in such a manner as to be capable of communicating both with one another and with a central memory MU and input/output units IOU. The input/output units IOU enable the central subsystem to communicate with peripheral subsystems (not shown).

The central memory MU may be embodied by means of a plurality of modules or memory boards connected to the system bus SB by way of an interface circuit SCU acting as both a memory controller and a controller of the bus SB. In the conventional manner, the bus SB constitutes a data bus DTS, an address bus ADS, and command and control lines CDS.

Each processor CPU essentially includes microprogrammed processing means CP and a cache memory CA serving to interface with the system bus SB. The cache memory CA is composed of memory circuits DAT, which are connected to the data bus DTS, and a controller DIR, which is connected to both the address bus ADS and the control lines CDS. The processing means CP include a plurality of functional units EAD, BDP, FPP, to which specific functions are respectively assigned. In particular, the unit EAD is an addressing unit connected to the controller DIR by address lines AD. The units EAD, BDP, FPP are also connected to the memory circuit DAT by an internal data bus DT and to the controller DIR by internal command and control lines CD.

The controller DIR controls the operations of reading and writing of the memory circuits DAT via the address lines ADR and control lines CDR. It also serves to control the operations of reading and writing of the central memory MU, to perform data transfers between the memory MU and the memory circuits DAT. Finally, in the embodiment shown, the controller DIR also contains the interface circuits serving to exchange messages (for example, requests and acknowledgements) between the processor CPU and the other processors CPU$_i$, or the input/output units IOU.

Aside from the aspect of the exchanges of messages between processors, the system of FIG. 1 performs like a conventional system. Hence there is no need to describe the known aspects of its function, and so the ensuing description will be devoted to the aspects directly linked with the invention.

Figure 2:
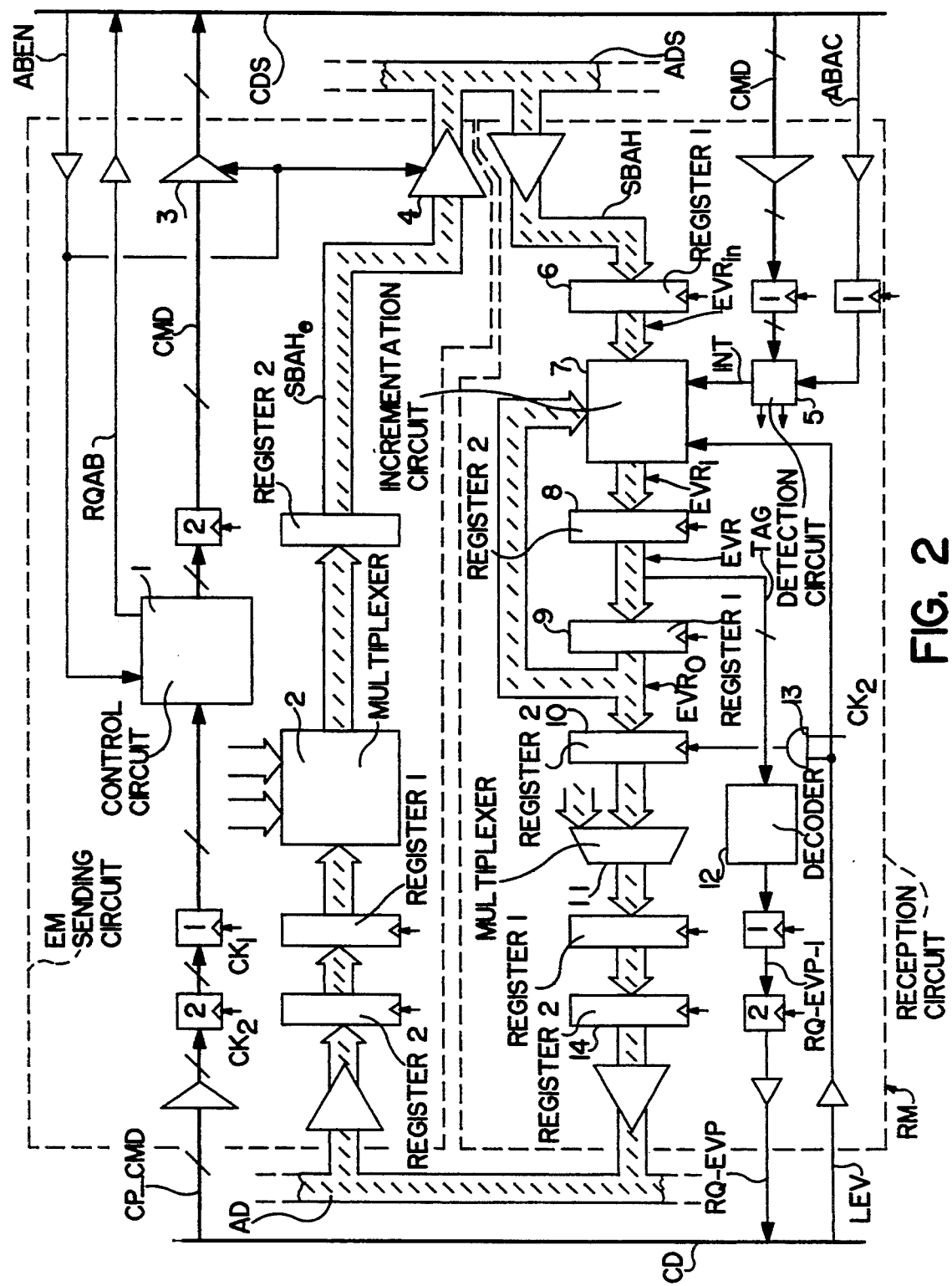
FIG. 2 shows the interface circuits of a processor of the system enabling it to communicate with the other processor.

The embodiment that will be described below is realized first by particular circuits of the controller DIR for transmitting messages. These circuits will be discussed in conjunction with FIG. 2.

In the embodiment proposed, the message is exchanged between the interface DIR and the processing means CP, on the one hand, and the other processors, on the other, are carried by address buses, AD and ADS, respectively. The transmission of messages between the processor CPU and the other processors uses a sending circuit EM and a receiving circuit RM of the controller DIR. These circuits function in two phases, defined by the synchronizing signals CK1 and CK2 furnished by a clock, not shown.

The sending circuit EM includes a control portion, essentially comprising a circuit 1 for decoding and controlling sending, the input of which receives the signals CP-CMD originating in some of the control lines CD, after amplification and locking in registers (reference numerals 1 and 2 indicate that they are synchronized by CK1 and CK2, respectively). The circuit 1 furnishes a bus system request signal RQAB, which is sent after amplification, over one of the control lines CDS, to the bus controller SCU. After amplification, the circuit 1 also receives an authorization signal ABEN originating in the controlled SCU, over one of the lines CDS. Finally, by way of a register synchronized with CK2, the circuit 1 furnishes command signals CMD applied to the input of an amplifier 3, the output of which is connected to control lines CDS. The amplifier 3 is commanded by the signal ABEN.

The sending circuit EM also includes an address transfer portion (also used for transferring messages), including a multiplexer 2, one of the inputs of which is connected to the bus AD by way of an amplifier, and registers. The other inputs of the multiplexer 2 are connected to address registers used by the controller DIR to perform the conventional functions of addressing the central memory MU. The output of the multiplexer 2 is connected to the bus ADS by way of a register synchronized with CK2, lines SBAHe, and an amplifier 4, commanded by the signal RQAB.

The sending circuit EM functions as follows: when the processing means CP must send a message to another processor CPU$_i$, they verify first whether the interface DIR is available, by checking a signal indicating that input registers (not shown) are occupied. If that is the case, they position the command lines CP-CMD on a given binary profile and place the message on the bus AD. As will be seen hereinafter, the message includes an indication of the number of the addressee processor. After two clock phases CK2, CK1, the command CP-CMD is decoded by the circuit 1, which then issues the request signal RQAB. This signal is received by the bus controller SCU, which in response furnishes the authorization signal ABEN when the bus SB is available. The presence of this signal has the effect on the one hand of validating the amplifiers 3 and 4, and on the other of resetting the output of the sending command circuit 1 to zero. As a result, the signals CMD and SBAHe are placed on the lines CDS and the bus ADS, respectively. They then appear at the input of the reception circuits of the interfaces of the processors, including the originating processor.

Before the function upon reception is explained, it will be useful to describe the reception circuits CD. As in the case of the sending circuit, the reception circuit includes a command portion, which includes a detection circuit 5 that by way of amplifiers and registers synchronized by CK1 receives the signals CMD and ABAC, sent over the lines CDS. The signals CMD are the command signals defined above, which may originate in any processor. The signal ABAC is a signal indicating that the address bus is busy, generated by the bus controller SCU and received by each processor.

The detection circuit 5 includes a decoder with a plurality of outputs, each output corresponding to a particular binary profile of the signal CMD. In particular, the output INT is validated when the signal CMD corresponds to sending of a message.

The message transfer portion of the reception circuit RM includes an input register 6, synchronized with CK1, the input of which is connected to the address bus ADS by way of the lines SBAH and an amplifier. The output $EVR_{in}$ of the register 6 is connected to the input of a writing and incrementation circuit 7. The output $EVR_i$ of the circuit 7 is connected to the input of a set of three registers 8, 9, 10 connected in cascade and synchronized by the clock signals CK2, CK1, CK2, respectively. The output $EVR_o$ of the register 9 is connected to a second input of the circuit 7. The output of the register 10 is connected to the internal address bus AD by way of a multiplexer 11, two registers synchronized by CK1 and CK2, respectively, and an amplifier.

The reception circuit RM, finally, includes a control portion for the exchange of signals with the processing means CP of the processor. It includes a decoder 12 that at its input receives one portion TAG of the output lines EVR of the register 8. The lines TAG correspond to one zone of the message, the value of which represents the category of message received. The output of the decoder 12, via two flip-flops, synchronized by CK1 and CK2, respectively, and one amplifier, furnishes the signal RQ-EVP, which is applied to one of the internal command lines CD. The signal RQ-EVP, for a predetermined logic state, signals that a message addressed to the processor is waiting. Another of the lines CD furnishes a reading command signal LEV, which after amplification is applied both to a command input of the circuit 7 and to the clock input of the register 10, by way of a synchronization gate 13 validated by the clock signal CK2.

The reception circuit RM functions as follows: when a message has been placed on the address lines ADS in accordance with the sending mechanism described above, the bus controller SCU places the signal ABAC at a predetermined logical value. This signal ABAC validates the detection circuit 5, which performs decoding of the command signal CMD. If the logical profile of the signal CMD corresponds to sending of a message, the circuit 5 places its output INT at a predetermined logic state. This signal validates the functioning of the circuit 7, which performs the analysis of the message present in the register 6. If it is addressed to the processor, this message is transferred to the register 8. The presence of a message is detected again by the decoder 12, which furnishes the signal RQ-EVP signaling the existence of the waiting message.

Once the processing means CP have accepted the signal RQ-EVP, they send the reading command signal LEV, in phase CK1, which in the next phase CK2 causes loading of the message into the register 10. The signal LEV also commands the circuit 7 to reset the register 8 to 0. In the next cycle CK2, the message is in the output register 1 and can be read by the processing means CP.

The embodiment of function of the circuit 7 will be described in detail with reference to FIGS. 4–8, but it is appropriate beforehand provide some specific information on the message format.

Figure 3:
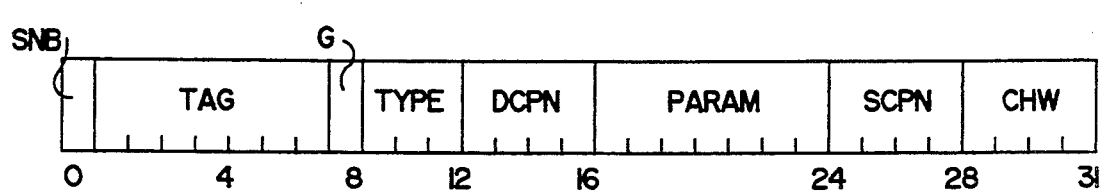
FIG. 3 shows a message format for the dialog between the processors.

FIG. 3, by way of non-limiting example, shows one message format that can be used in the present invention for a 16-processor system. The message has a width of 32 bits, numbered from 0 to 31, and it is subdivided into a plurality of fields, having the following meaning:

the field SNB (bit 0) corresponds to the number of the system to which the processors for the message in question belong. This field is provided so that the system can be made to operate like two independent subsystems;

the field TAG (bits 1–7) is reserved for defining the message category. This field makes it possible in particular to indicate whether the message is addressed to a processor and whether the message originates in another processor an input/output controller or the bus controller;

the field G (bit 8) serves to indicate whether the message is a global request, that is, one addressed to all the processors of the system;

the field TYPE (bits 9–11) serves to identify the request, that is, it contains the identity of the action to be executed by the recipient processor;

the field DCPN (bits 12–15) contains the number of the processor to which the message is addressed;

the field PARAM (bits 16–23) is a field reserved for extensions of some of the other message fields;

the field SCPN (bits 24–27) contains the number of the originating processor; and the field CHW (bits 28–31) is a field reserved for containing the number of acknowledgements received.

Figure 4:
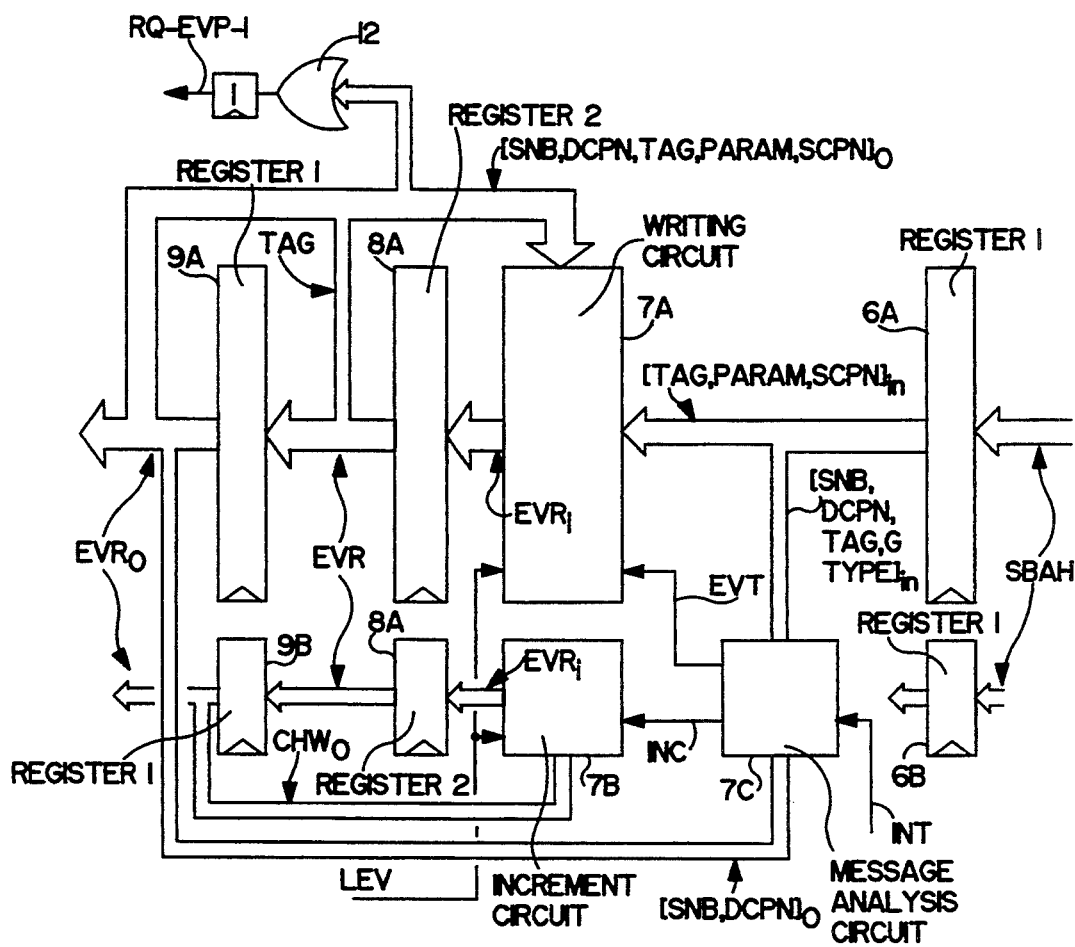
FIG. 4 shows a portion of the reception circuit of the interface of FIG. 2.

FIG. 4, in more detailed fashion, shows the writing and incrementation circuit 7, the registers 6, 8 and 9, and the decoder 12. For the sake of clarity, each of the registers 6, 8 and 9 are subdivided into two parts, 6A-6B, 8A-8B and 9A-9B, respectively, with the letter B corresponding to the field CHW and the letter A corresponding to the rest of the message. In addition, the various fields involved in this circuit are assigned subscripts "in" or "o", to indicate that they originated in the input register 6 or in the register 9, respectively.

It has already been noted that the input SBAH of the register 6 is connected to the bus ADS. However, when the data carried by the bus ADS are messages, then bits 28–31 corresponding to the field CHW are not significant. Consequently the part 6B of the register 6 is not used for processing messages.

The circuit 7 is made up of a writing circuit 7A, an incrementation circuit 7B and a circuit 7C for analysis of the messages received. A first input of the circuit 7C is connected to the output lines of the register 6, which correspond to the fields SNB, DCPN, TAG and TYPE. A second input of the circuit 7C is connected to the output lines of the register 9 that correspond to the field SNB and DCPN. The function of the circuit 7C is validated by the signal INT originating in the detection circuit 5 described above. The circuit 7C includes a first output EVT connected to the writing circuit 7A and furnishing a writing command signal. A second output INC of the circuit 7C furnishes an incrementation command signal applied to the incrementation circuit 7B.

A first input of the circuit 7A receives the output lines of the registers 6 that correspond to the fields TAG, PARAM and SCPN. A second input receives the fields SNB, DCPN, TAG, PARAM and SPN that originate in the register 9. The circuit 7A also receives the reading command signal LEV. The output of the circuit 7A is applied to the input of the part 8A of the register 8.

One input of the incrementation circuit 7B is connected to the output of the part 9B of the register 9 that is assigned to the field CHW. The circuit 7B also receives the incrementation signal INC and the reading command signal LEV. Its output is connected to the input of part 8B of the register 8.

The output lines of the register 8 that correspond to the field TAG are connected to the input of the decoder 12, the output of which is connected to the input a flip-flop synchronized by CK1 and at its output furnishing the signal RQ-EVP-1.

The circuit of FIG. 4 functions as follows. When a message has been loaded into the register 6 in phase CK1, the presence of the message is signaled by the signal INT. The analysis circuit 7C detects whether this message has indeed been addressed to the processor, by comparing the fields SNB and DCPN in register 6 and register 9, respectively. By decoding the fields TAG and G, it also detects whether the request is one addressed to a processor. If so, it activates the signal EVT. As a function of the field TYPE, the circuit 7C also determines whether this message is an acknowledgement, in which case it activates the incrementation command signal INC.

If the writing command signal EVT and the reading command signal LEV are inactive, the circuit 7A recopies the contents of part 9A of the register 9 into the part 8A of the register 8.

If the signals EVT and LEV are active simultaneously, the circuit 7A performs recopying of the contents of part 6A of register 6 into the part 8A of register 8.

If the signal LEV is active, while the signal EVT is inactive, then the circuit 7A resets the part 8A of the register 8 to zero.

If the incrementation signal INC is active while the reading signal LEV is inactive, then the incrementation circuit 7B recopies the contents of part 9B, increased by one, into part 8B.

If the signals INC and LEV are inactive simultaneously, then the circuit 7B recopies the contents of part 9B into part 8B.

If the signals INC and LEV are active simultaneously, the circuit 7B forces the least significant bit of part 8B to one and resets all the other bits to zero.

In the exemplary embodiment described, the field TAG includes one of its bits at 1, when the message corresponds to communications between processors. Accordingly, the decoder 12 can be embodied by a simple OR gate, the output of which is set to 1 if the message contained in the register 8A is a request or an acknowledgement.

FIGS. 5-8 show the various subassemblies of the circuit 7 in more detailed fashion. Each binary signal shown in these figures is assumed to be active, when it takes the value of logical 1.

Figure 5:
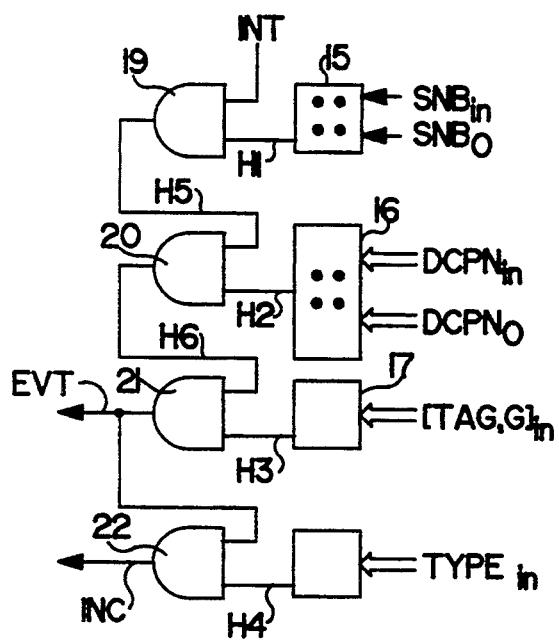
FIGS. 5, 6, 7, 8 show details of the embodiment of the circuit of FIG. 4.

FIG. 5 shows the circuit 7C for analysis of the messages received. It includes a first comparator 15, for comparing the system numbers $SNB_{in}$ and $SNB_o$ contained in the message received and in the register 9, respectively. A second comparator 16 compares the processor numbers $DCPN_{in}$ and $DCPN_o$ contained in the message received and in the register 9, respectively. If these numbers match, then the outputs H1 and H2 of the comparators 15 and 16 take the value 1. A decoder 17 receives the fields TAG and G of the messages received and furnishes an output signal H3 at 1, when one of the bits of these fields is 1, thus signaling the information contained in the register 6 is a message that must be accepted by the processor. A second decoder 18 receives the field type of the message received and furnishes a signal H4 that takes the value of 1 when the value of this field represents an acknowledgement.

A first AND gate 19 that receives the signals H1 and INT at its input has its output connected to the input of a second AND gate 20, the second input of which receives the signal H2. Thus the logical state of the output H6 of the gate 20 indicates whether the message received is indeed addressed to the processor. A third AND gate 21 receives the signals H6 and H3 at its input and at its output furnishes the signal EVT, which if it takes the value of 1 indicates that the message present in the register 6 is addressed to a processor, and that the processor is indeed that of the reception circuit.

Finally, the signals EVT and H4 are applied to the input of the AND gate 22, the output signal INC of which takes into account the supplementary condition that the message received is an acknowledgement.

Figure 6:
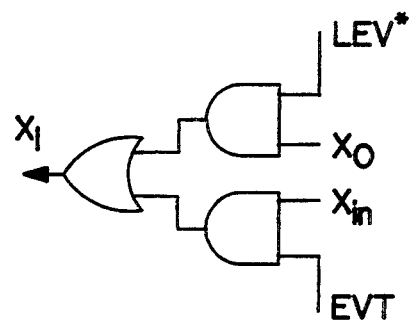
Figure 7:

FIGS. 6 and 7 show base cells with which the writing circuits 7A can be embodied, each cell being assigned to one bit of the message. These cells are of two types, depending on whether the corresponding bits are capable of being loaded from the input register 6, or whether a simple recopying of bits corresponding to register 9 is performed.

The circuit in FIG. 6 corresponds to the first case, or in other words relates to the bits of the fields TAG, PARAM, SCPN. Each bit of these fields has been designed by the letter X, with subscripts "o" or "in", depending on whether they originate in the register 9 or the register 6, respectively. The corresponding output bit is indicated by $X_i$. The cell of FIG. 6 includes a first AND gate that at its input receives the signal EVT and the bit $X_{in}$. A second AND gate ET, at its input, receives the signal LEV*, which is a complement of the signal LEV, and the bit $X_o$. The two outputs of these AND gates are applied to the input of an OR gate, the output of which furnishes the bit $X_i$. It is easy to verify that the circuit of FIG. 6 indeed achieves the function intended in the description of FIG. 4. If LEV=1 and EVT=0, then $X_i$=0. If LEV=0 and EVT=0, then $X_i$=$X_o$. If LEV=1 and EVT=1, then $X_i$=$X_{in}$. The case where LEV=0 and EVT=1 corresponds to a running total of information.

The cell of FIG. 7 relates only to the bits the fields SND and DCPN and makes it possible to permanently perform recopying of these fields into the register 8. These fields are normally loaded upon initialization of the system by means of maintenance circuits, which has not been shown in the drawings for the sake of simplicity.

It should be noted that the embodiment of the writing circuit that has just been described is linked in part with a choice that is made as to the meaning and usage of certain message fields. In particular, in the absence of a reading command LEV, the circuit of this drawing figure makes it possible to perform the running total of certain information present in the register 9 with other information contained in the message received. For example, each binary position of the field PARAM corresponds to a particular function that is to be executed by the recipient processor, when that position is 1.

Figure 8:
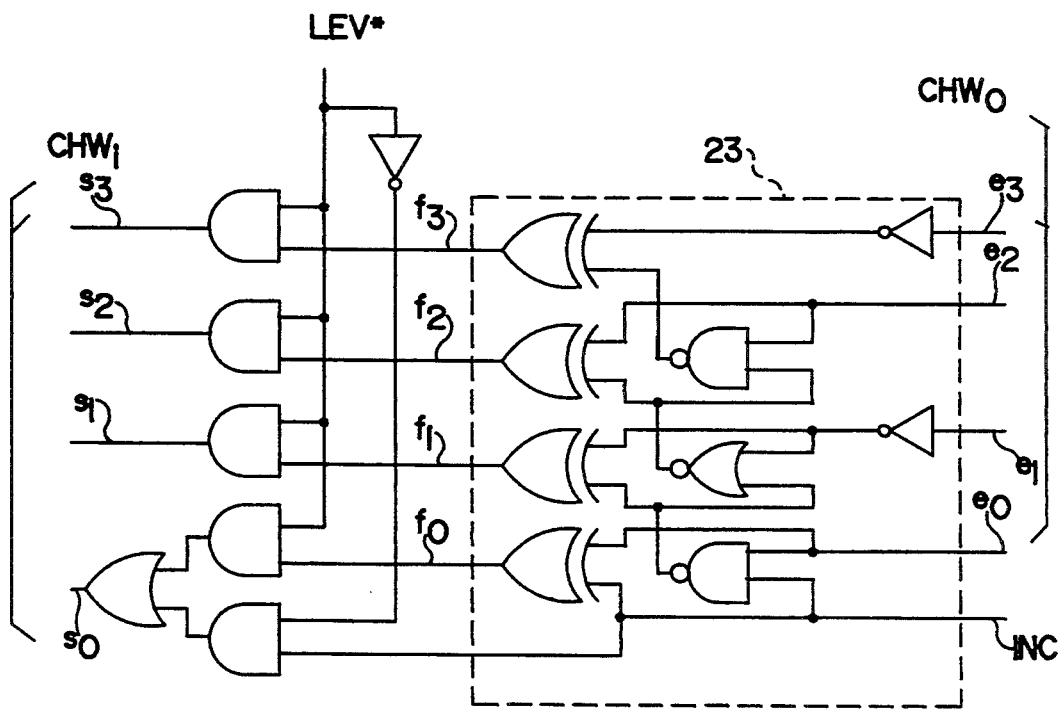

FIG. 8 shows an embodiment of the incrementation circuit 7B. It includes an addition circuit 23 that at its input receives the four bits e0, e1, e2, e3 of the field CHW of the register 9 and the incrementation signal INC. The circuit 23 furnishes the bits f0, f1, f2, f3 representing the number $CHW_o$, if INC=0 or $CHW_o+1$, if INC=1. At its output, the circuit furnishes the bits s0, s1, s2, s3 corresponding to the field CHW and applied to the input of the part 8B. The bits s1, s2, s3 are each delivered via one AND gate, one input of which receives the signals f1, f2, f3, respectively, and the other input of which receives the signal LEV*. The bit s0 is furnished by a complex logic gate identical to the circuit of FIG. 6. The first AND gate of this circuit receives the signal LEV* and the signal f0 at its input, while the second AND gate receives the signal LEV and the signal INC at its input.

Functionally, when LEV=0, the bits s0, s1, s2, s3, respectively, reproduce the signals f0, f1, f2, f3, respectively. If LEV=1, the bits s1, s2, s3 are forced to 0, as is the bit s0, if INC=0. Contrarily, if INC=1, then s0 is forced to 1.

It is understood that the embodiment that has just been described may be subjected to various variations or adaptations without departing from the scope of the invention. In particular, the field CHW could include more than 4 bits, with the incrementation circuit consequently being modified, for systems that include more than 16 processors.

The description now turns to how the method of the invention can be exploited for employing the dispatching mechanism in a multiprocessor system. First, however, some indication should be given as to the means that enable employment of this mechanism. These means are essentially located in the processing unit or units of the processor. These units may be of the microprogrammed type, as described in French Patent Application 89 16952, filed on Dec. 21, 1989, and entitled "Processeur a plusieurs unites microprogrammes avec mecanisme d'execution anticipee des instructions" [Processor with a Plurality of Microprogrammed Units, With Method for Anticipated Execution of Instructions].

A processor of this type includes at least one control block capable of executing a set of microprograms (firmware). This control block includes a microsequencer that addresses a microprogram memory, each output word of which constitutes one microinstruction that acts on certain resources (operators, registers, and so forth) of the processor.

Part of the firmware serves to interpret the instructions that can be executed by the processor. The rest of the firmware, which is generally called "system firmware", is composed of a certain number of modules, each intended to perform system management operations. The modules that perform the dispatching are located in this system firmware. Another major module, known as the "event poller" EVP, serves to select the modules to be executed as a function of a certain number of indicators representing events that can be taken into account by the system. The event poller EVP is accessed by a hardware part of the control block, which in response to a signal RQ-EVP for detecting such an event, forces the address of the microprogram memory to a predetermined value AD-EVP, so as to make a jump to the module EVP.

Figure 9:
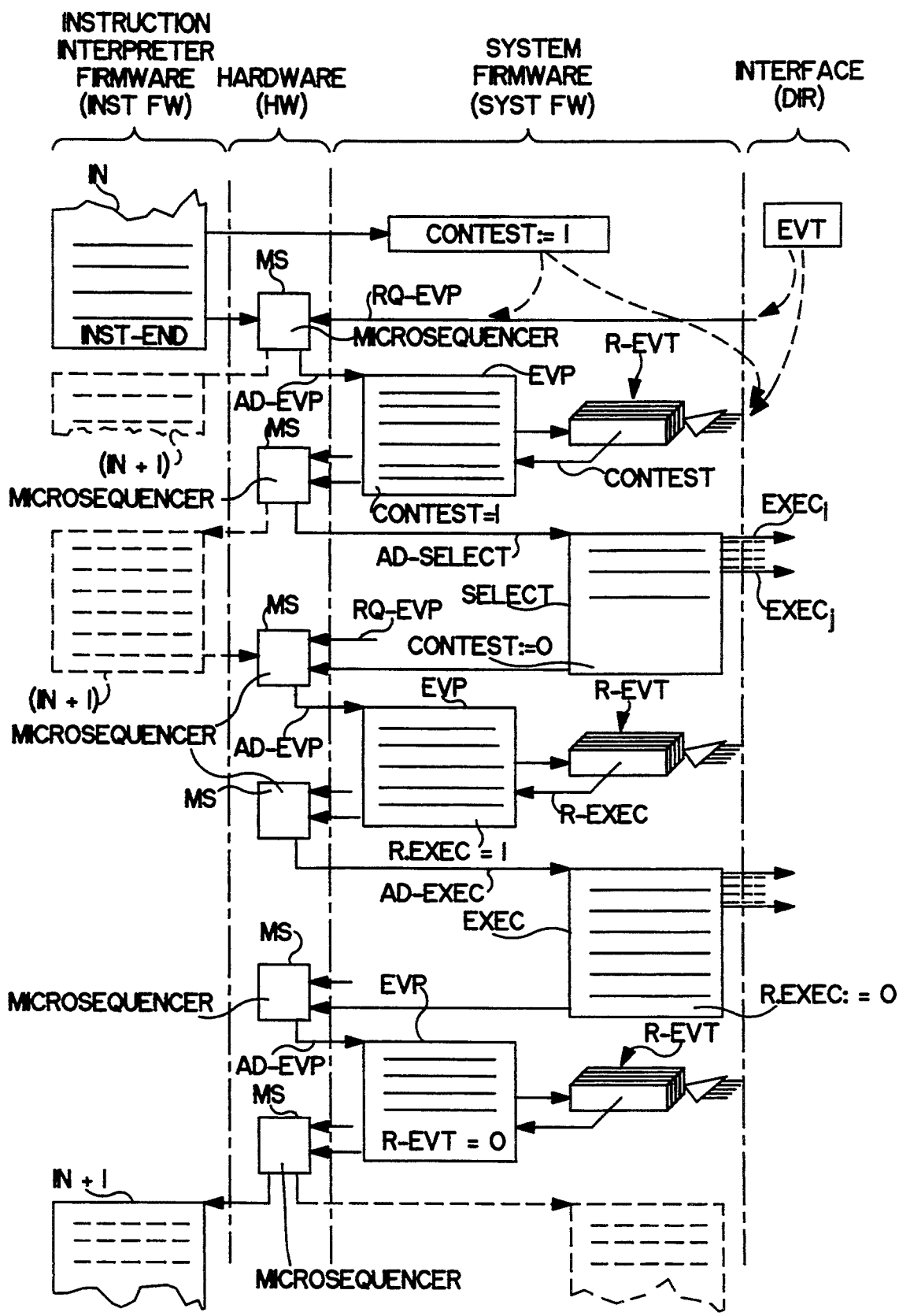
FIGS. 9 and 10 are schematic representations of the course of dispatching operations.

FIG. 9 is a schematic representation of the function of a processor in which dispatching is triggered. From left to right, this drawing shows the four parts of the processor: the instruction interpretation firmware INST FW, the hardware HW, the system firmware SYST FW and the interface DIR. The operations proceed from top to bottom, and it is assumed that initially the processor is in the course of executing an instruction $I_n$, which causes a reset, because of the dispatching. This phenomenon is achieved by setting a CONTEST indicator to 1 (CONTEST:=1). This indicator corresponds in practice to the logical state of a flip-flop in one of the registers R-EVT reserved to the firmware. In parallel, other events EVT originating for example on the outside, can be produced by way of the interface DIR. In the same way as the internal events, these external events position an indicator that represents the event produced.

The appearance of such an event is translated into a signal RQ-EVP received by the microsequencer MS of the control block. As soon as the processor is in an interruptible state, in the present case at the end of instruction INST-END, the microsequencer MS makes a jump AD-EVP to the interrupt poller EVP. This element analyzes all the events recorded beforehand, by consulting the event registers R-EVT in a predetermined order of priority. As soon as the poller EVP detects an event to be processed, for example the state 1 of the contest indicator, it commands the microsequencer MS in such a way as to address the microprogram memory at the AD-SELECT input point of the SELECT module for executing the dispatching.

The SELECT module then performs analysis of the queue of ready processes Q/PR/RDY and, as a function of priorities and the order of arrival of the processes in the queue and of the state of the processors and possible constraints associated with the processes, it brings about the sending of corresponding requests $EXEC_i$, $EXEC_j$ addressed to selected processors $CPI_i$, $CPU_j$, to inform them that they must execute a change of context, that is, must assume a state for executing another process, determined by the SELECT module.

As the addressee processors accept the request $EXEC_i$, they send the acknowledgements in response, which are counted in the reception circuit of the interface DIR in accordance with the mechanism described above. At the end of its execution, the SELECT mode consults the register 10 of the reception circuit by sending the reading command signal LEV and comparing its value with the number of requests $EXEC_j$ that have been sent. These operations will be described in detail in conjunction with FIG. 10.

The last step of the SELECT module comprises resetting the CONTEST indicator to 0 (CONTEST:=0). The microsequencer MS then jumps back to the input of the event poller EVP, which re-analyzes the event registers R-EVT. If other events have been signaled, for instance if the processor has sent a request EXEC to itself, the event poller EVP then commands the jump to the AD-EXEC input point of the change-of-context module EXEC. Once execution by this module ends, the indicator R-EXEC is reset to 0 (R-EXEC=0), and the microsequencer jumps again to the input of the event poller EVP. If it does not detect any other event to be processed (R-EVT=0), the microsequencer MS jumps to the input point of the microprogram for executing the following instruction $I_{n+1}$. It is understood that the instruction $I_{n+1}$ corresponds to the first instruction in the queue of the new process executed by the processor.

Figure 10:
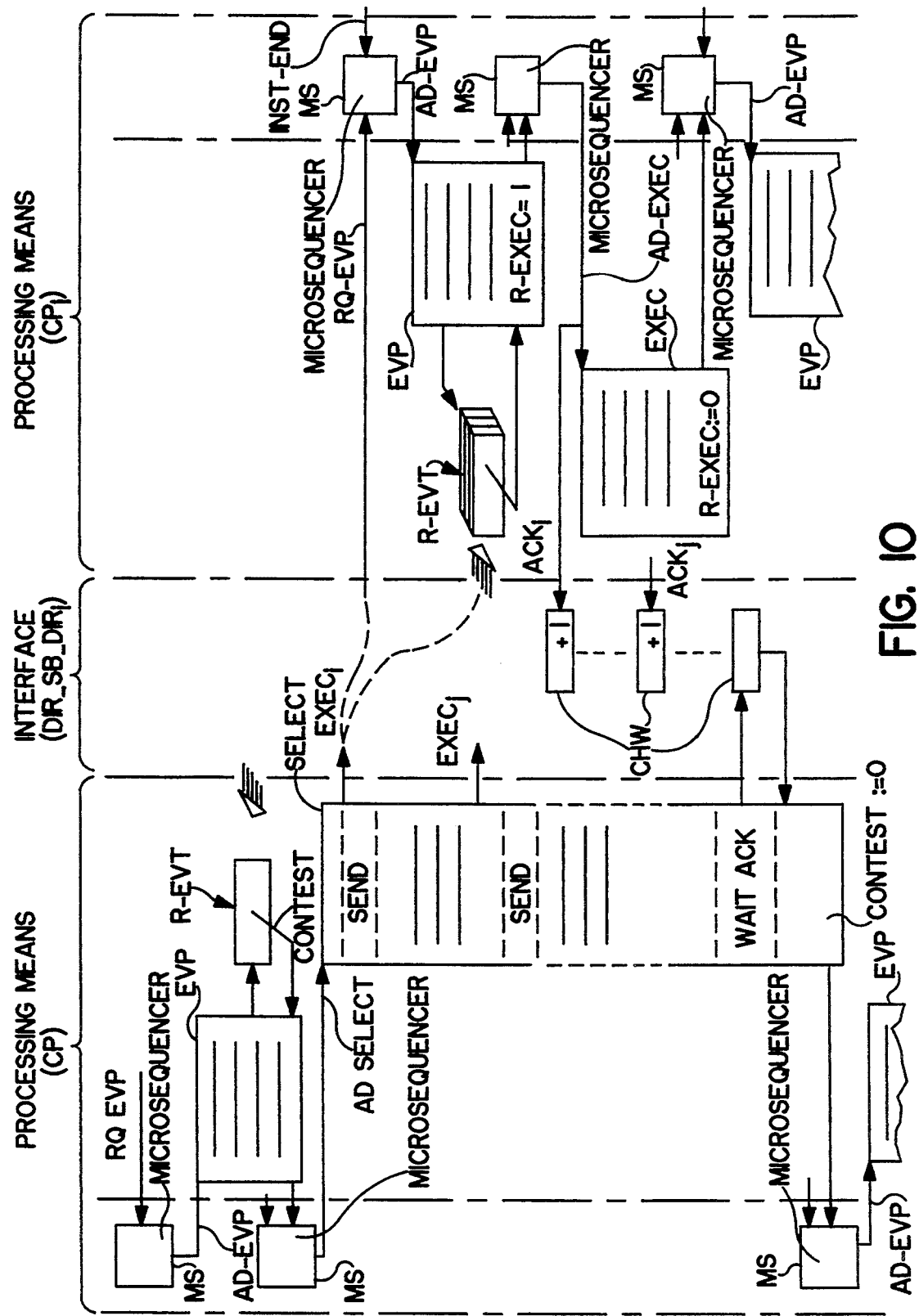

FIG. 10 is an illustration similar to FIG. 9, which more particularly shows the respective operations performed by a processor CPU that originates requests and by one of the addressee processors $CPU_i$.

In this drawing figure, on the left and right, respectively, the processing means CP and $CP_i$ of the two processors in question can be seen, while the central portion represents the corresponding interfaces DIR and $DIR_i$ and the system bus SB.

As before, it is assumed that the execution of the SELECT module is triggered in the processor CPU by way of the event poller. This execution, which involves numerous accesses to memory, may be subdivided into two main phases: a first phase is dedicated to processes with constraints, if any, while the second phase processes the other case, that is, the processes that can be executed by any processor. Furthermore, the SELECT operation counts up the total number of requests $EXEC_i$ that must be sent.

Each time a predetermined processor $CPU_i$ must be notified of an assignment of a predetermined process, the SELECT module performs a SEND operation, which normally ends with the sending of a request $EXEC_i$ to the processor in question. As has already been indicated, this request takes the form of a message, which travels via the interface DIR from the originating processor. This message is then transmitted over the address lines of the system bus SB, and finally is received by all the interfaces $DIR_i$ of the processor. Because of the addressee field DCPN, the interface $DIR_i$ of the addressee processor loads the message into its registers and informs the processing means $CP_i$ by the signal RQ-EVP.

As has already been explained in the description of FIG. 9, the signal RQ-EVP, at the end of execution of an instruction, causes callup of the event poller, which consults the event registers R-EVT. In particular, poller EVP performs the reading by the signal LEV of the request that has been signaled. The poller EVP then detects that the request is a demand for execution of the module EXEC. The microsequencer then jumps to the input AD-EXEC of this module, and simultaneously, the sending of an acknowledgement message $ACK_i$ is performed, in accordance with the method described above. As a result, in particular, the acknowledgement counter CHW of the processor originating the request $EXEC_i$ is increased by one unit (assuming that the counter has not been consulted at that moment). The processor $CPU_i$ then begins executing the module EXEC in accordance with the description given in U.S. Pat. No. 4,590,550. This operation involves consulting a mailbox assigned to the processor, in which the originating processor, in the course of the SEND operation, has written all the indications necessary for the recipient processor, in particular the identity or number NJP of the new process to be executed.

When $CPU_i$ has completed all the updating and changes of its contents, it resets the indicator R-EXEC to 0 (R-EXEC:=0) and jumps back to the input of the event poller EVP, to verify whether any other events are to be taken into account.

After sending the request $EXEC_i$, the originating processor CPU continues executing the SELECT module independently of the operations performed in the other processors, and in particular without waiting to receive the acknowledgement $ACK_i$. When the SELECT operation is at the point of being completed, or in other words when each process waiting to be run has been assigned to a processor, or when each processor has been assigned to one process, the SELECT module performs the WAIT-ACK operation, which comprises consulting the state of the counter CHW and comparing its value with that of the firmware counter CFW indicated the number of requests sent to the other processors. If these numbers match, the SELECT operation is completed. The CONTEST indicator is then reset to 0, and the processor jumps to the input of the event poller. Contrarily, if the number of acknowledgements received is less than the number of requests sent, the firmware counter is decremented by the number of requests already received (state of the counter CHW), and the SELECT module is placed in a waiting loop, which periodically brings about consultation with the counter CHW. The waiting lasts until the two counters are in equality. It is understood that this waiting loop is equipped with a surveillance mechanism that triggers an exception operation at the end of a predetermined waiting period.

The SELECT and EXEC operations require that a certain number of data be manipulated, which will now be described in conjunction with FIGS. 11 and 12.

Figure 11:
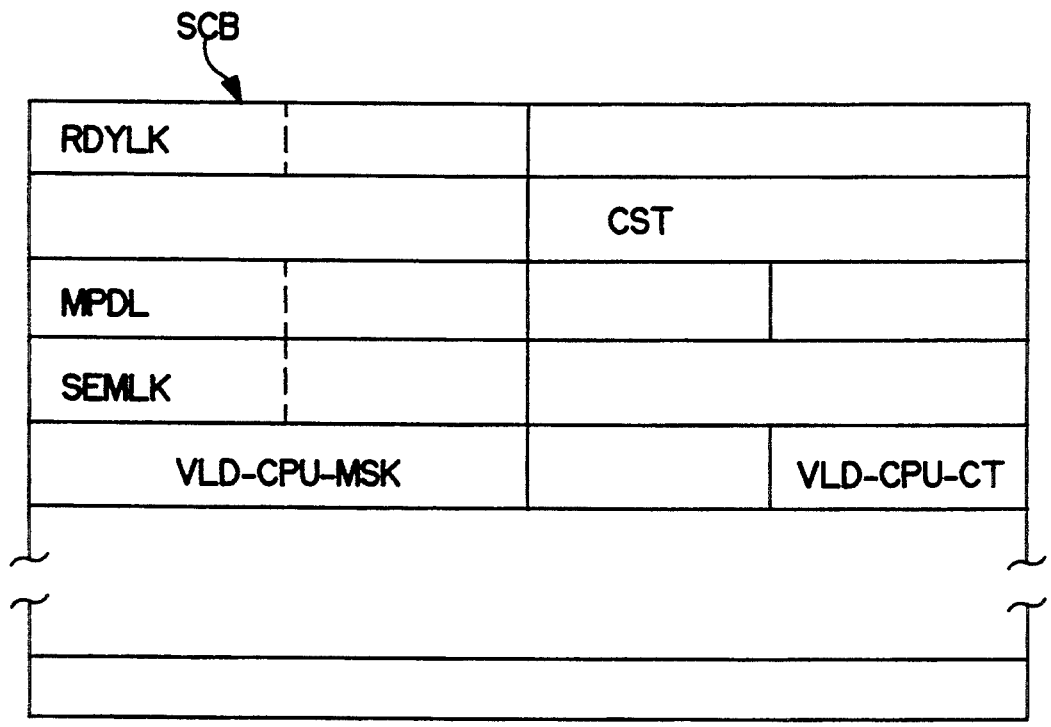
FIGS. 11 and 12 show the main system resources used to perform dispatching.

FIG. 11 represents a memory zone reserved for the system, called the system control block SCB, which is used in particular by the SELECT module. The block SCB includes the following elements, among others:

a lock RDYLK to protect the queue of ready processes Q/PR/RDY;

a dialog lock MPDL;

a semaphore protection lock SEMLK;

an indicator CST of the number of processes with constraint constituted in the system;

a mask VLD-CPU-MSK of valid processors; and an indicator VLD-CPU-CT of the number of valid processors.

The locks that have just been mentioned serve, in a multiprocessor system, to prevent certain associated resources common to the entire system from being modified by several processors at once. Thus before access to one of these resources, a processor first performs an indivisible operation known as "TEST AND SET" on the lock; this comprises reading the lock, and if it is free (for example at 0), putting it in the busy state (for instance, at 1). Contrarily, if the lock is busy, access to the resource is prohibited.

Accordingly, the locks RDYLK and SEMLK make it possible to protect the queue Q/PR/RDY and the semaphores involved in the operations P and V, respectively.

Similarly, the lock MPDL is tested before any operation involving dialog between the processors. Thus the SELECT operation cannot begin until this lock has been tested. If it was free, it is placed in the busy state, and the SELECT operation is run. It is understood that at the end of the operation it is freed again.

The number of processes with constraints CST is a datum that serves to facilitate analysis of the Q/PR/RDY file done by the SELECT module.

The mask VLD-CPU-MSK serves to select the processors to which the requests are addressed. This mask is representative of the configuration of valid processors: each binary position corresponds to one processor, and if this position is at 1, the associated processor is valid.

The number of valid processors VLD-CPU-CT is equal to the number of bits at "1" in the mask VLD-CPU-MSK. This number is used by SELECT to obtain the depth of analysis of Q/PR/RDY, when there is no process with constraints (CST=0). If CST differs from 0, the depth of analysis may be obtained by a particular SELECT algorithm.

Figure 12:
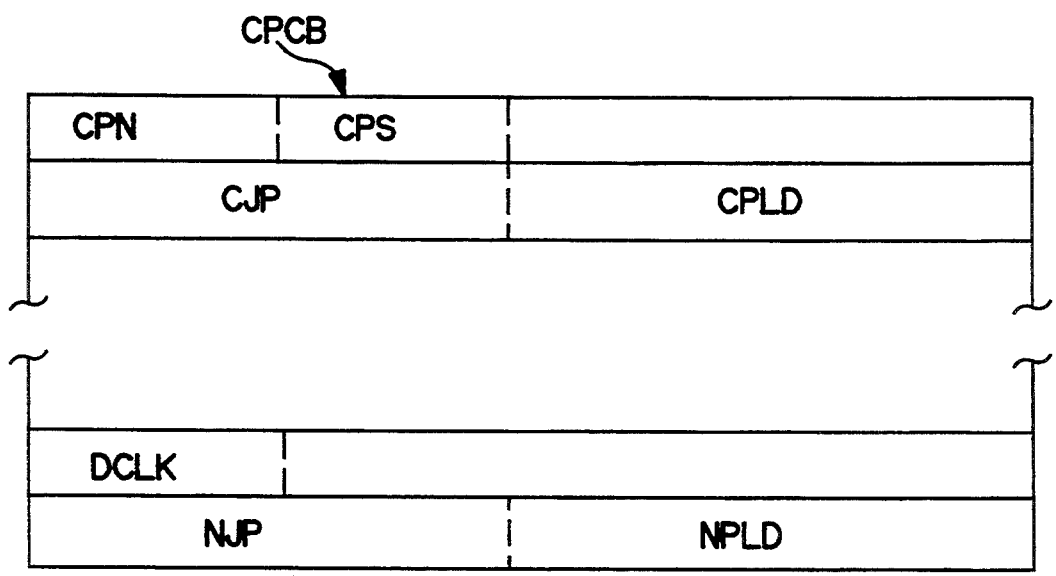

FIG. 12 shows a memory zone associated with processor, known as a processor control block CPCB and serving as a mailbox for the exchange of information between the processor originating request $EXEC_i$ and the addressee processors of these requests.

The block CPCB includes one field CPN containing the number of the processor, one field CPS indicating the state of the processor, one field CJP containing the number of processes being run in the processor, one field CPLD representing the address of the link of this process in the file Q/PR/RDY, one field NJP indicating the number of the new process that the processor must execute, and one field NPLD indicating the address of the link of this process.

The block CPCB also contains an indicator DCLK, the logic state of which signals whether the mailbox is occupied, i.e. busy, or not.

The block CPCB is used in the following way: when the SELECT operation determines that a predetermined process NJP must be executed by a predetermined processor CPN, it accesses the block CPCB of this processor, and performs a "TEST AND SET" operation on the indicator DCLK. If DCLK is free, it puts it in the occupied state and inscribed the number NJP of the new process and the associated pointer NPLD.

When it performs the corresponding EXEC operation, the selected processor CPN accesses its block CPCB to take into account the number NJP of the process to be run. On the other hand, when the EXEC operation is completed, it puts the indicator DCLK back in the free state. This lock then makes it possible for the processor running the SELECT operation to assure, before any request is sent by a send operation, that the addressee processor is not already running an EXEC operation. This is why the SELECT operation can be organized in such a way as to calculate the number of requests during the first and second steps, without taking into account the possibility or impossibility of effective sending of these requests. If at the moment the SEND operation is executed, it proves that sending the corresponding request is impossible (the mailbox is occupied), then the number of requests is decremented by one unit, to take into account the fact that one less acknowledgement is to be expected.

What is claimed is:

1. A method for dialog between processors (CPU, $CPU_i$) of a multiprocessor information processing system, said dialog being produced when one of said processors (CPU) executes operations (SELECT) triggering the sending (SEND) of requests ($EXEC_i$) addressed to at least one other processor ($CPU_i$), wherein said requests ($EXEC_i$) represent an instruction to said at least one other processor ($CPU_i$) to execute a particular function, each addressee processor ($CPU_i$) sending an acknowledgement ($ACK_i$) for signalling the originating processor (CPU) that said request has been accepted and said particular function has been executed, said method comprising for any of said operations (SELECT) not requiring any constraint as to the order of acceptance of said requests, causing the execution of said operations to elapse without taking into account the reception by the originating processor (CPU) of acknowledgements ($ACK_i$) brought about by the sending of requests in the course of said operations; calculating in the course of said operations the total number (CFW) of requests ($EXEC_i$) that are to be sent or must be sent by the processor executing said operations; counting number (CHW) of acknowledgements received by the originating processor (CPU) and monitoring the condition of the equality of said total number (CFW) of requests and said number of (CHW) of acknowledgements received.

2. The method of claim 1, wherein the requests and the acknowledgements take the form of messages, containing an indication of the type of message (TAG, G, TYPE), and wherein the reception of an acknowledgement by a processor (CPU) comprises detecting that a message addressed to said processor (CPU) has been sent and that this message is an acknowledgement.

3. The method of claim 2, further including authorizing the execution by a processor (CPU) of an operation for triggering the sending of multiple requests only after a "free" state of at least one system lock (MDPL) has been tested, in which case effective execution of said operation is preceded by the assumption of a "busy" state of said lock (MDPL), and said lock being freed when said operation is completed.

4. The method of claim 2, wherein the counting of the number (CHW) of acknowledgements received by a processor (CPU) is effected independently of the reading of the corresponding acknowledgement messages by the processing means (CP) of said processor (CPU); and further including storing said number (CHW) of acknowledgements received in the last message received and which is addressed to said processing means (CP); and wherein the monitoring of the equality between the number (CFW) of requests and the number (CHW) of acknowledgements is effected by said processing means (CP) after the reading of said last message.

5. The method of claim 4, further including authorizing the execution by a processor (CPU) of an operation for triggering the sending of multiple requests only after a "free" state of at least one system lock (MDPL) has been tested, in which case effective execution of said operation is preceded by the assumption of a "busy" state of said lock (MDPL), and said lock being freed when said operation is completed.

6. The method of claim 4, further including resetting of said number (CHW) of acknowledgements to zero upon reading of said last message by said processing means, on the condition that no new acknowledgement arrives at the time of said reading; and after said reading reducing the number (CFW) of requests by the number (CHW) of acknowledgements, the equalities between the number of requests (CFW) and the number of acknowledgements (CHW) being then established when the new number of requests (CFW) thus calculated equals zero.

7. The method of claim 6, further including authorizing the execution by a processor (CPU) of an operation for triggering the sending of multiple requests only after a "free" state of at least one system lock (MDPL) has been tested, in which case effective execution of said operation is preceded by the assumption of a "busy"

state of said lock (MDPL), and said lock being freed when said operation is completed.

8. The method of claim 1, further including authorizing the execution by a processor (CPU) of an operation for triggering the sending of multiple requests only after a "free" state of at least one system lock (MDPL) has been tested, in which case effective execution of said operation is preceded by the assumption of a "busy" state of said lock (MDPL), and said lock being freed when said operation is completed.

9. The method of claim 8, further including authorizing the execution by a processor (CPU) of an operation for triggering the sending of multiple requests only after a "free" state of at least one system lock (MDPL) has been tested, in which case effective execution of said operation is preceded by the assumption of a "busy" state of said lock (MDPL), and said lock being freed when said operation is completed.

10. An information processing system including a plurality of processors (CPU, CPU$_i$) capable of dialog by way of interface circuits (DIR) associated respectively with said processors and bus links (SB) connecting said interface circuits to one another, at least one of said processors (CPU) including means for executing operations (SELECT) triggering the sending of a request (EXEC$_i$) addressed to at least one other processor (CPU$_i$) wherein said requests (EXEC$_i$) represent an instruction to said at least one other processor (CPU$_i$) to execute a particular function, each addressee processor (CPU$_i$) including means for sending an acknowledgement (ACK$_i$) to the originating processor (CPU) to signal that said at least one processor has accepted a request addressed thereto and has executed said particular function, said system being characterized in that said request originating processor includes:
  first counting means (BDP) enabling the determination of the total number (CFW) of requests that are to be sent or must be sent in the course of said operations;
  second counting means (7B, 7C), activated each time an acknowledgement is received; and
  comparison means for detecting the equality between said number (CFW) of requests and the number (CHW) of acknowledgements received; such that for each operation that requires a dialog without constraint as to the order of acceptance of requests by the addressee processors, said detection of equality authorizes the originating processor (CPU) to complete the execution of said operation.

11. A system as defined by claim 10, wherein said requests (EXEC$_i$) and said acknowledgments (ACK$_i$) are of the message type, including an identification field (TAG, G, TYPE) enabling the addressee of the message and whether the message is an acknowledgement to be indicated; each processor (CPU) including processing means (CP) connected to the interface circuit (DIR) of said processor (CPU); said interface circuit (DIR) including means (8, 9) for memorizing the messages received, said memorizing means (8, 9) being accessible by reading to said processing means (CP); and a writing circuit (7A) for said memorizing means (8, 9) and an analysis circuit (7C) for analysis of the messages received to detect whether a message received is addressed to the associated processor (CPU), and for commanding said writing circuit (7A) when said message is received to load the message received into said memorizing means (8, 9); said second counting means (7B, 7C) including an incrementation circuit (7B); said analysis circuit (7C) being further constructed and arranged so as to detect whether a message received is an acknowledgement and to command the incrementation circuit (7B) upon receipt of an acknowledgment; said interface circuit (DIR) including a notification circuit (12) for informing the processing means (CP) that a message addressed to the associated processor (CPU) is available in said memorizing means (8, 9); and said first counting means (BDP) comprising part of said processing means (CP).

12. The system of claim 11, wherein said memorizing means (8, 9) include reserved sites (8B, 9B) for containing the number (CHW) of acknowledgments received, furnished by said incrementation circuit (7B).

13. The system of claim 12, wherein said writing circuit (7A) is constructed and arranged so as to reset said memorizing means (8, 9) to zero after their reading by the processing means (CP), on the condition that no new acknowledgement addressed to the processor (CPU) has been received; and said first counting means are constructed and arranged so as to decrement said number (CFW) of requests by the value contained in said reserved sites (8B, 9B) after each reading.

14. The system of claim 13, wherein said memorizing means (8, 9) include a first register (8), having an input connected to an output of the writing circuit (7A), and a second register (9), having an input connected to an output of the first register (8), a particular field (9B) of said second register (9) being connected to an input of the incrementation circuit (7B), said incrementation circuit having an output connected to an input of the corresponding field (8B) of the first register (8), said incrementation circuit (7B) furnishing at its output a value equal to the contents of said particular field (9B), or the value zero in the event of resetting to zero, increased by one unit when the reception of an acknowledgement addressed to the processor (CPU) is detected by the analysis circuit (7C).

15. The system of claim 14, wherein said processing means (CP) includes at least one microprogrammed unit (BDP), said operations (SELECT) corresponding to microprograms executed by said microprogrammed unit; said first counting means being embodied by a firmware counter providing a microprogrammed counting algorithm, and said reading of reserved fields (8B, 9B) causes the decrementation of the firmware counter by a value equal to the contents of said reserved sites.

16. The system of claim 15, wherein the execution of said microprogram is authorized only after an operation of testing the "free" state of at least one system lock (MPDL), in which case the effective execution of said microprogram is preceded by the assumption of the "busy" state of said lock (MPDL); and said microprogram frees said lock at the end of its execution.

17. The system of claim 16, wherein the reading of the number (CHW) of acknowledgements received is programmed at the end of said microprogram, prior to the freeing of the lock (MPDL).

18. The system of claim 13, wherein said processing means (CP) includes at least one microprogrammed unit (BDP), said operations (SELECT) corresponding to microprograms executed by said microprogrammed unit; said first counting means being embodied by a firmware counter providing a microprogrammed counting algorithm, and said reading of reserved fields (8B, 9B) causes the decrementation of the firmware counter by a value equal to the contents of said reserved sites.

19. The system of claim 18, wherein the execution of said microprogram is authorized only after an operation of testing the "free" state of at least one system lock (MPDL), in which case the effective execution of said microprogram is preceded by the assumption of the "busy" state of said lock (MPDL); and said microprogram frees said lock at the end of its execution.

20. The system of claim 19, wherein the reading of the number (CHW) of acknowledgements received is programmed at the end of said microprogram, prior to the freeing of the lock (MPDL).

21. A method for performing the distribution of processes (JP) to processors (CPU, CPU$_i$) of a system, comprising the following steps:

triggering in one of said processors, in response to an event capable of causing a modification in the choice of processes that are to be executed, of a selection operation (SELECT) to determine the allocation of the processes to the processors of the system as a function of an order of priority of processes ready to be executed;

sending a request (EXEC$_j$) in the course of said selection operation (SELECT), to each selected processor (CPU$_j$) to inform the selected processor of the identity of the process assigned to said processor for execution and response by an addressee processor by sending an acknowledgement (ACK$_j$) when a request is received;

using a dialog method between processors (CPU, CPU$_i$) wherein dialog is produced when one of said processors (CPU) executes operations (SELECT) triggering the sending (SEND) of requests (EXEC$_j$) addressed to at least one other processor (CPU$_i$) wherein requests (EXEC$_j$) represent an instruction to said at least one other processor (CPU$_i$) to execute a particular function, each address processor (CPU$_j$) sending an acknowledgement (ACK$_j$) for signalling the originating processor (CPU) that said request has been accepted, and said particular function has been executed wherein said dialog method comprises for any of said operations (SELECT) not requiring any constraint as to the order of acceptance of said requests, causing the execution of said operations to elapse without taking into account the reception by the originating processor (CPU) of acknowledgements (ACK$_j$) brought about by the sending of requests in the course of said operations; calculating in the course of said operations the total number (CFW) of requests (EXEC$_j$) that are to be sent or must be sent by the processor executing said operations; counting the number (CHW) of acknowledgements received by the originating processor (CPU) and monitoring the condition of the equality of said total number (CFW) of requests and said number of (CHW) of acknowledgements received.

22. The method of claim 21, wherein said selection operation includes:

a first step, comprising identification of the processes (NJP) assigned to particular processors (CPI$_i$), and then for each processor (CPU$_j$) selected, incrementation of the first counting means (BDP) and sending of a request (EXEC$_j$) to the processor (CPU$_j$) selected;

a second step, comprising determination of the processes that remain to be assigned, and then for each process then selected, incrementation of the first counting means (BDP) and loading its identity into a stack; and a third step, comprising emptying said stack, in the course of which, for each process extracted from the stack, one request (EXEC$_j$) is sent to a processor that remains available.

23. The method of claim 22, further including calculating the number (CFW) of requests (EXEC$_j$) in the course of the first and second steps, without taking into account the possibility of effectively sending said requests (EXEC$_j$), and in the event that effecting sending of a request (EXEC$_j$) at the time of execution of the first or the third step is impossible, decrementing the number (CFW) of requests by one unit.

24. The method of claim 21, wherein the requests and the acknowledgement take the form of messages, containing an indication of the type of message (TAG, G, TYPE), and wherein the reception of an acknowledgement by a processor (CPU) comprises detecting that a message addressed to said processor (CPU) has been sent and that this message is an acknowledge.

25. The method of claims 21, wherein the counting of the number (CHW) of acknowledgements received by a processor (CPU) is effected independently of the reading of the corresponding acknowledgement messages by the processing means (CP) of said processor (CPU); and further including storing said number (CHW) of acknowledgements received in the last message received and which is addressed to said processing means (CP); and wherein the monitoring of the equality between the number (CFW) of requests and the number (CHW) of acknowledgements is effected by said processing means (CP) after the reading of said last message.

26. The method of claim 21, further including resetting of said number (CHW) of acknowledgements to zero upon reading of said last message by said processing means, on the condition that no new acknowledgement arrives at the time of said reading; and after said reading reducing the number (CFW) of requests by the number (CHW) of acknowledgements, the equalities between the number of requests (CFW) and the number of acknowledgements (CHW) being then established when the new number of requests (CFW) thus calculated equals zero.

* * * * *